Dec. 26, 1961 P. A. KIRSTEN 3,014,511
ROTARY TOOL FOR WOODWORKING AND WOODCUTTING MACHINES
Filed March 12, 1959 7 Sheets-Sheet 1

INVENTOR.
Paul Arthur Kirsten

Dec. 26, 1961 P. A. KIRSTEN 3,014,511
ROTARY TOOL FOR WOODWORKING AND WOODCUTTING MACHINES
Filed March 12, 1959 7 Sheets-Sheet 2
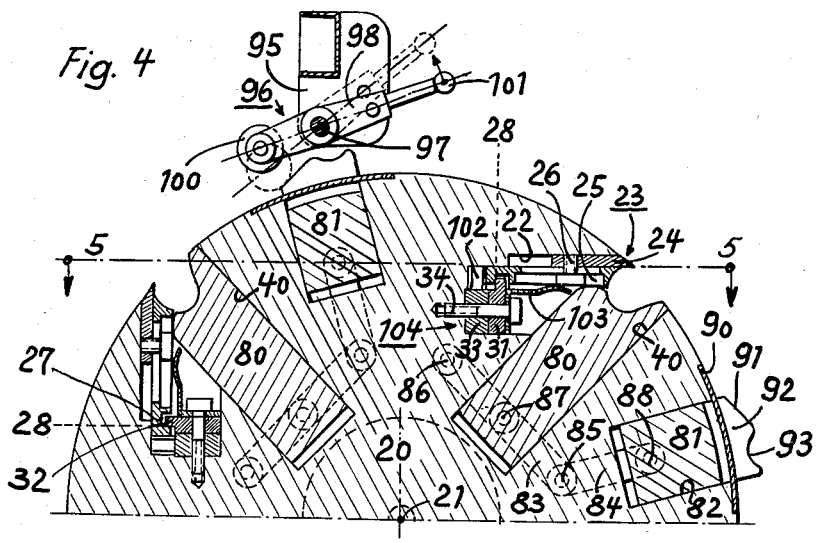
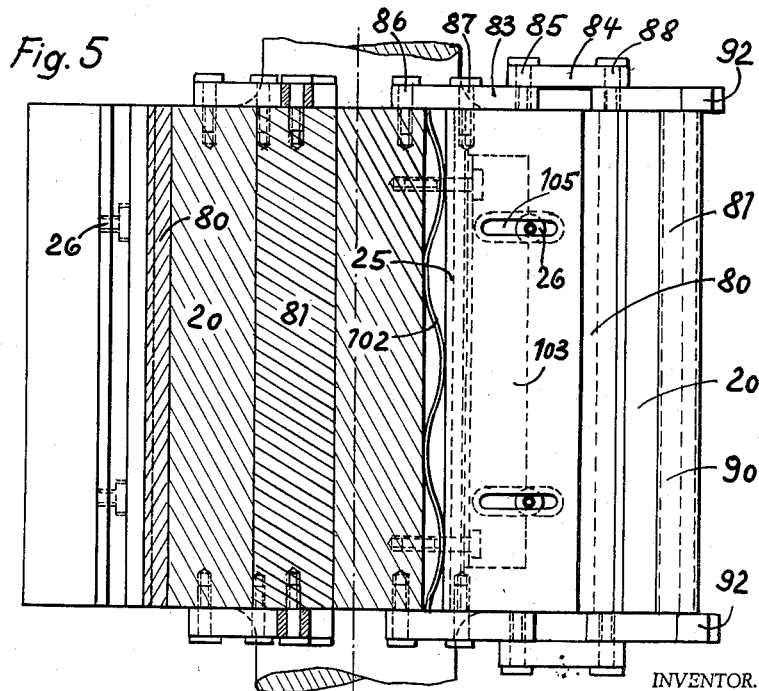
INVENTOR.
Paul Arthur Kirsten

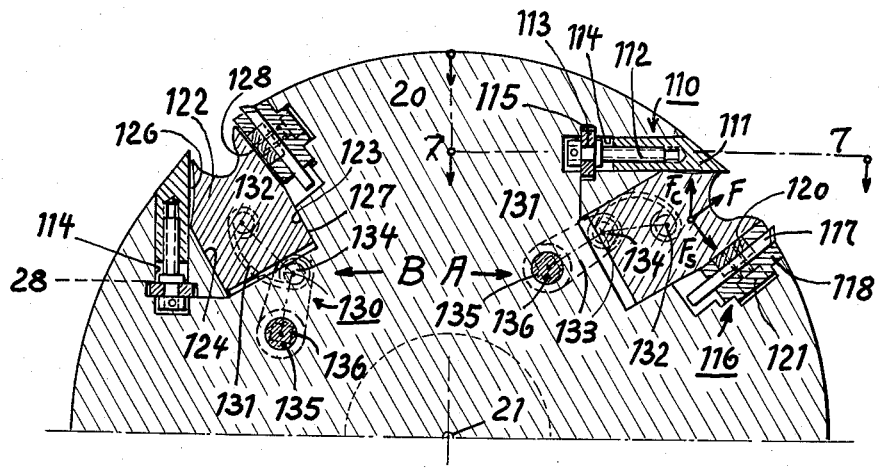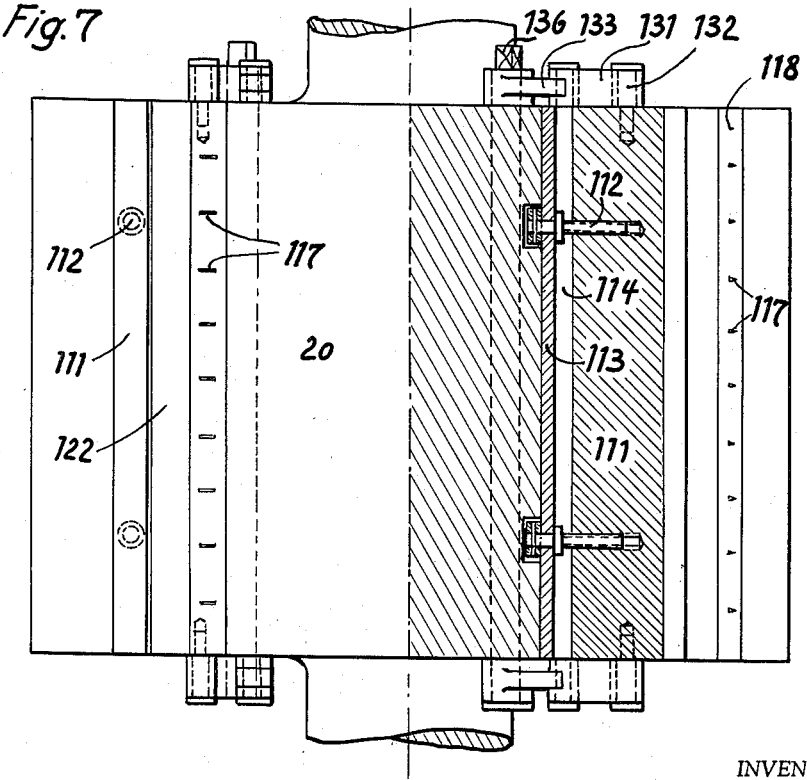

Dec. 26, 1961 P. A. KIRSTEN 3,014,511
ROTARY TOOL FOR WOODWORKING AND WOODCUTTING MACHINES
Filed March 12, 1959 7 Sheets-Sheet 4
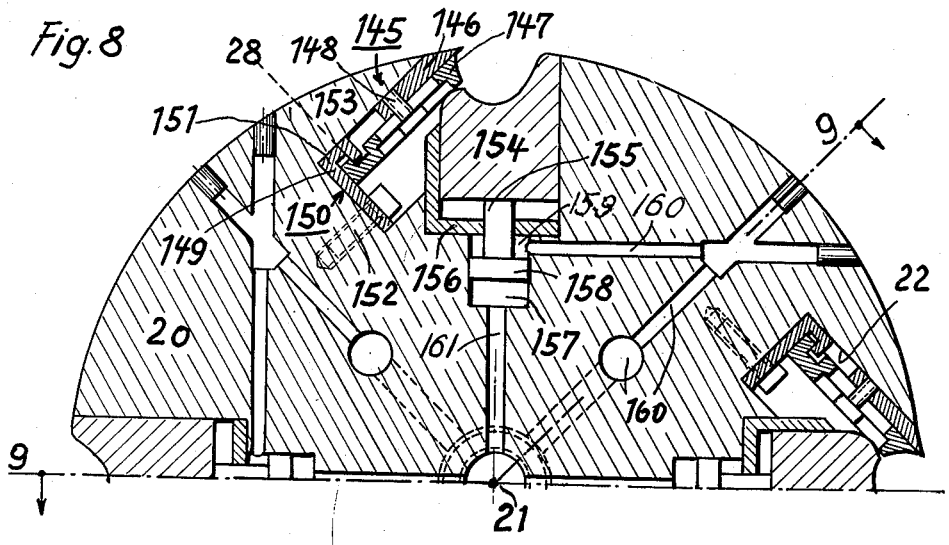
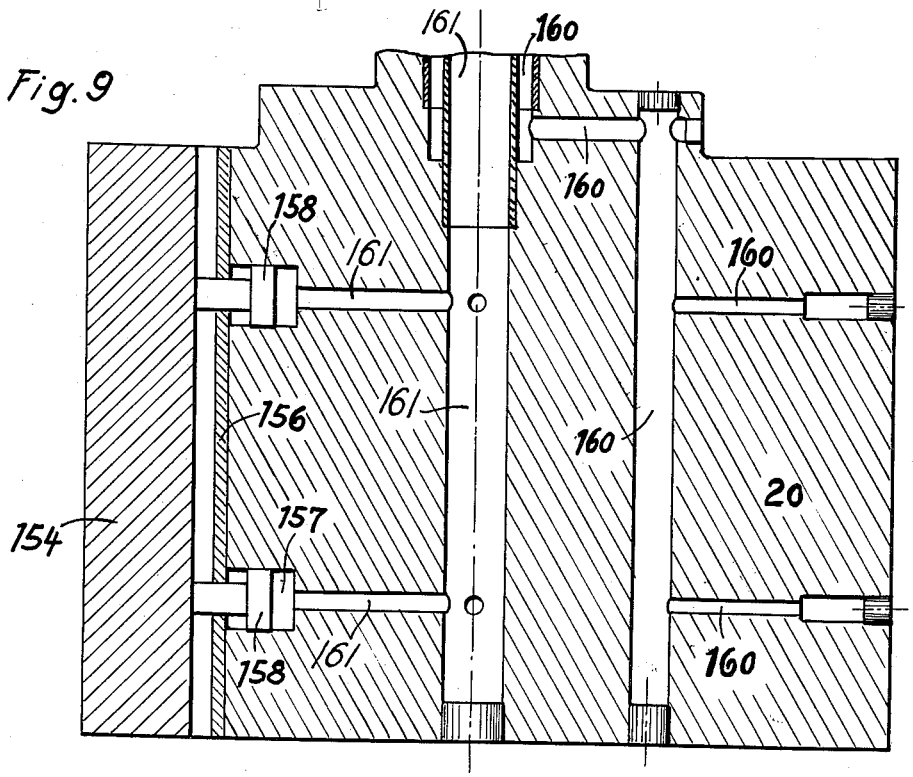
INVENTOR.
Paul Arthur Kirsten
BY Dec. 26, 1961 P. A. KIRSTEN 3,014,511
ROTARY TOOL FOR WOODWORKING AND WOODCUTTING MACHINES
Filed March 12, 1959 7 Sheets-Sheet 5
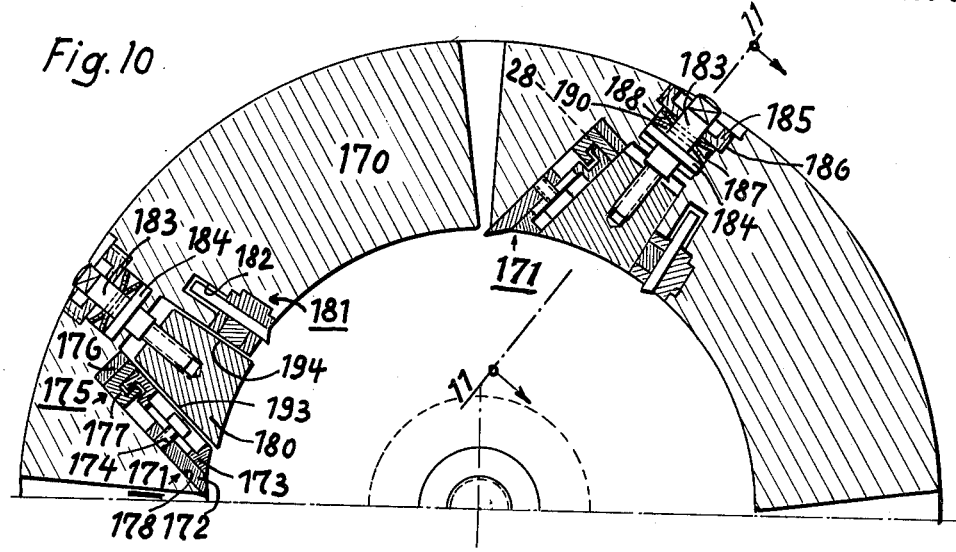
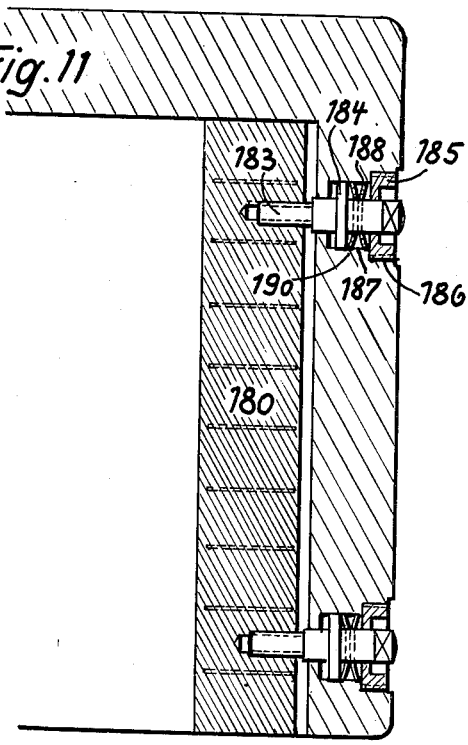
INVENTOR.
Paul Arthur Kirsten
BY Dec. 26, 1961 P. A. KIRSTEN 3,014,511
ROTARY TOOL FOR WOODWORKING AND WOODCUTTING MACHINES
Filed March 12, 1959 7 Sheets-Sheet 6

INVENTOR.
Paul Arthur Kirsten
BY

Dec. 26, 1961  P. A. KIRSTEN  3,014,511
ROTARY TOOL FOR WOODWORKING AND WOODCUTTING MACHINES
Filed March 12, 1959  7 Sheets-Sheet 7

INVENTOR.
Paul Arthur Kirsten
BY

United States Patent Office 3,014,511
Patented Dec. 26, 1961

3,014,511
ROTARY TOOL FOR WOODWORKING AND
WOODCUTTING MACHINES
Paul Arthur Kirsten, 26 Bonner Talweg, Bonn, Germany
Filed Mar. 12, 1959, Ser. No. 798,946
21 Claims. (Cl. 144—230)

This invention relates to rotary woodworking and woodcutting machines of the type which includes a rotor body, and more particularly to such machines which include a plurality of knife assemblies inserted in corresponding recesses of the rotor body. Each knife assembly is removable for sharpening of the cutting edge, after which the distance between the cutting edge and a reference mark or surface on the blade holder for the knife is adjusted so that, upon reinsertion of the knife assembly in a recess of the rotor body, the projection of the cutting edge beyond the periphery of the rotor body is precisely determined.

Rotary woodworking tools of the general class in which the invention finds utility may comprise either a solid rotor body, in which the supporting structure for the knife assemblies essentially comprises a solid cylinder with the knife assemblies projecting beyond the outer surface of the cylinder, or a hollow rotor body, in which the supporting structure takes the form of a hollow cylinder with the cutting or active edges of the knife assemblies projecting into the interior of the hollow cylindrical portion of the structure. Each rotor body normally includes a plurality of recesses which extend from the outer surface of the rotor body to a point in the interior along an axis inclined to the radial direction; as used herein, the radial direction refers to a radius of the rotor body, that is, a line drawn from the axis of rotation of the rotor body to any point on the circumference thereof. A knife assembly is then fitted into each of these recesses in such manner that the cutting edge of the knife projects slightly beyond the outer periphery (or slightly into the interior of a hollow rotor body) of the solid rotor body so that, as the rotor body is rotated and a piece of work is positioned adjacent thereto, the cutting edges of the knives are effective to make a fine cut along the surface of the work piece. The rotor body may also include a bore positioned adjacent each recess, with a pressure plate or bar fitted within the bore in much the same manner that a piston fits within a cylinder wall; such bore is usually in the radial direction. The knife, pressure plate, recess, and bore are formed and positioned so that when the rotor body is driven in angular rotation, centrifugal force drives the pressure plate outwardly and engages a point on the knife, thereby fixing the knife in position during the cutting operation. Before the knives are forced against the walls of the recesses by means of the pressure plates, each knife must be brought into exact alignment with the rotor body; that is, each of the knives or its cutting edge must project beyond the periphery of the tool body for an equal and precisely determined distance. Even when using instruments, it is difficult to adjust each knife so that its cutting edge is exactly parallel with the periphery of the rotor body, and so that its cutting edge projects beyond the periphery of the rotor body for exactly the same distance as does the cutting edge of each of the other knives.

Usually several bolts are provided for each pressure plate, to press the knives against the walls of their respective recesses. In order to secure the knives positively and safely within the rotor body when such body is rapidly rotated and the knives are subjected to large centrifugal forces, all of the bolts must be screwed in tightly. If the bolts of all the pressure plates are not tightened to exert the same pressure, it is possible that during fast rotation the large centrifugal force developed will shift the knife to one side, displacing the cutting edge from the desired position which is set with extreme precision prior to operation of the machine. Under extreme conditions, the knife might even be thrown out of the rotor body.

As a practical matter, it is hardly possible to effect uniform tightening of all the bolts so that the contact pressure for all the knives will be completely uniform over the entire knife surface. Because of human failure, the operator may even forget on occasion to tighten one or another of the many bolts. Manifestly, even if it were possible to effect precise and exact adjustment of the bolts, the tightening of all the bolts which is necessary after inserting the knives, and loosening of all the bolts which is required before removal of the knives for grinding, is a very time-consuming operation. These deficiencies of prior art woodworking devices are eliminated by practice of the invention.

It is a primary object of the present invention to provide a woodworking machine in which the knife assemblies are removable for adjustment outside the rotor body of the machine, so that after reinsertion of the knife assemblies the respective cutting edges project beyond the periphery of the rotor for exactly the same distance; that is, the cutting edges of all the knives lie on the same circle. With precise adjustment of the projection of the cutting edges beyond the rotor body, a better finish of the work piece to be machined by the woodworking tool is also obtained.

It is another object of the invention to minimize the time required for the removal and reinsertion of the knife assemblies.

Yet another object of the invention is a positive and safe anchoring of the knife assemblies within the rotor body so that such assemblies cannot be shifted by the various forces developed during rotation of the body, or thrown out of the recesses by the centrifugal force developed during angular displacement of the rotor body.

A woodworking machine constructed in accordance with the inventive teaching comprises a rotor body including a plurality of recesses, and a first reference surface adjacent each recess. A plurality of knife assemblies are also provided, with an individual knife assembly being positioned in an individual one of the recesses. Each knife assembly comprises a knife having a cutting edge, a blade holder having a second reference surface for engagement with the first reference surface in a reference plane, and fastening means for maintaining the knife and blade holder in a predetermined relationship within the recess. When the knife assembly is removed from the recess and the fastening means loosened, the knife and blade holder are displaceable relative to each other to effect a precise adjustment of the distance between the cutting edge and the reference plane, so that upon reinsertion of the knife assembly in a recess of the rotor body the projection of the cutting edge beyond the rotor body is precisely determined.

The features of the present invention which are believed to be novel are set forth with particularity in the appended claims. The invention itself, however, together with further objects and advantages thereof, may best be understood by reference to the following description taken in connection with the accompanying drawings, in the several figures of which like reference numerals identify like elements, and in which:

FIGURE 4 is a side sectional view of a second embodiment of the invention;

FIGURE 5 is a top view, partly in section, taken along the line 5—5 in FIGURE 4;

FIGURE 6 is a side sectional showing of yet another embodiment of the inventive structure;

FIGURE 7 is a top view, partly in section, taken along the line 7—7 in FIGURE 6;

FIGURE 8 is a sectional showing of still another embodiment of the invention;

FIGURE 9 is a sectional view, taken along line 9—9 of FIGURE 8;

FIGURE 10 is a sectional view of another embodiment of the invention, in which the cutting edges extend into the interior of a hollow rotor body;

FIGURE 11 is a sectional view, taken along line 11—11 of FIGURE 10;

Figure 1:
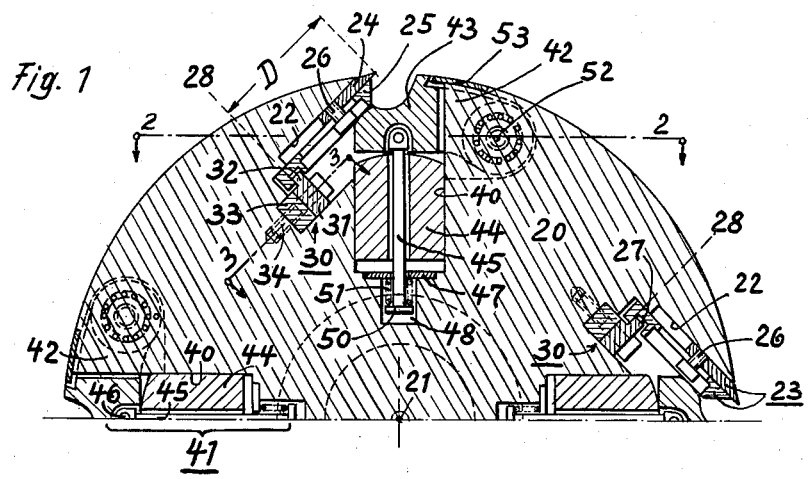
FIGURE 1 is a side sectional view, taken on a plane perpendicular the axis of the rotor body, of a first embodiment of the invention.
Figure 2:
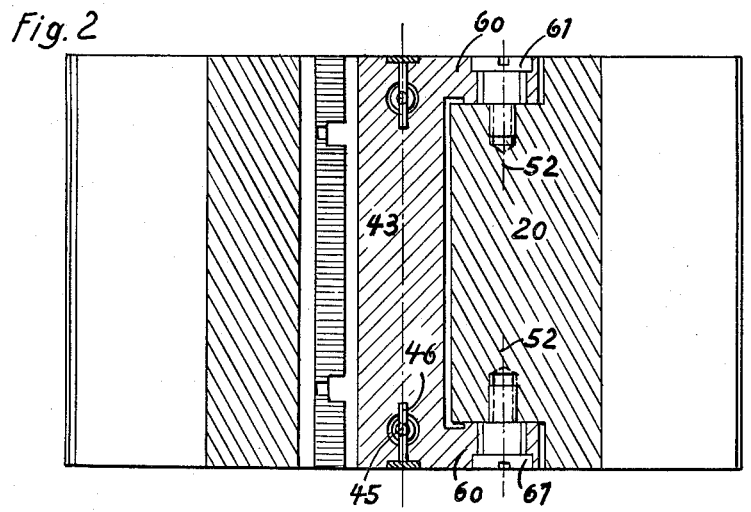
FIGURE 2 is a top view, partly in section, taken along line 2—2 in FIGURE 1.

In FIGURES 1 and 2, a rotor body 20 of the woodworking machine constructed in accordance with the inventive teaching has an axis of rotation designated 21. A plurality of recesses 22 are disposed around the periphery of rotor body 20; each recess 22 is inclined at an angle with respect to the radial direction of rotor body 20. A knife assembly 23, which in accordance with the inventive teaching comprises a cutting knife 24 and a blade holder 25, is positioned in each recess. The knife and blade holder are maintained in juxtaposition by fastening means such as one or more bolts 26, which may extend through blade holder 25 so that the threaded portion of the bolt is received in a corresponding tapped section of knife 24.

Bolts 26 are readily loosened when knife assembly 23 is removed from rotor body 20 to permit relative displacement between knife 24 and blade holder 25. The knife assemblies may be removed, for example, for sharpening the edges after a period of operation. By utilizing gauges or instruments held against blade holder 25 after loosening bolts 26, the relative positions of knife 24 and blade holder 25 are easily adjusted so that the precise distance of the cutting edge of knife 24 from a predetermined reference plane, coincident with a particular surface on blade holder 25, is precisely set. Thus, after bolts 26 are again tightened and the knife assemblies reinserted in rotor body 20, all of the cutting edges of the several knife assemblies project beyond the periphery of rotor body 20 by an equal distance.

To facilitate precise alignment of knife assembly 23 within the rotor body after knife sharpening and replacement, blade holder 25 includes a U-shaped channel 27 near one end thereof. Channel 27 includes a reference surface, one side of the channel, which lies in reference plane 28. After each sharpening of the cutting edges of knife 24, knife assembly 23 is adjusted so that the distance between the cutting edge of knife 24 and the reference surface of channel 27 is at a desired separation, to insure the projection of the cutting edges of the knives a predetermined distance beyond rotor body 20 after reinsertion of the knife assemblies.

Positioned in recess 22 adjacent each of knife assemblies 23 is an indexing assembly 30 which includes a first member 31 having a stop lug 32 thereon, and a second member 33 adjacent member 31. Members 31 and 33 are secured together by fastening means such as bolt or bolts 34, and, when such bolt is loosened, the members are displaceable with respect to each other in a manner which will be explained more fully hereinafter in connection with FIGURE 3.

Figure 15:
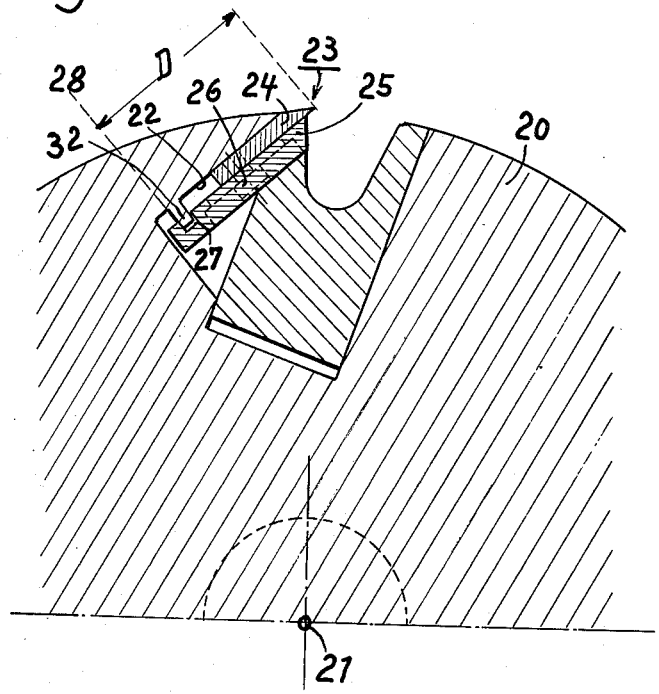
FIGURE 15 is a side sectional view, similar to FIGURE 1, illustrating another embodiment of the invention.

It is noted that stop lug 32 also has a reference surface which lies in reference plane 28. It is the flush engagement of the reference surfaces of channel 27 and stop lug 32 in reference plane 28 which provides a reference point or plane from which the distance of the cutting edge of knife 24 can be preset to determine with high accuracy the projection of the cutting edge beyond the periphery of the rotor body. An alternative construction illustrated in FIGURE 15, includes the provision of stop lug 32 or a similar indexing member on a wall of recess 22 adjacent blade holder 25, a construction which does not require an indexing assembly such as assembly 30.

Adjacent recess 22 and indexing assembly 30 is a bore section 40, extending along an axis in the radial direction. Within bore 40 is a pressure bar assembly 41, which includes as major components a lever 42 having a pressure plate section 43, and a weight 44 positioned below pressure plate 43. A rod 45 is connected by a pin 46 at its upper end to pressure plate 43. At its lower end, rod 45 passes through an aperture in shoulder member 47 which separates bore 40 and a recess 48. Rod 45 extends into recess 48 and is terminated in a collar or stop member 50. A spring 51 is disposed between collar 50 and shoulder member 47 to normally urge rod 45 downwardly, thereby causing lever 42 to pivot about its axis 52 and causing pressure plate 43 to be displaced slightly downwardly and remove pressure from the abutting portion of blade holder 25. Accordingly, when the machine is at rest and weight 44 is not displaced under the urging of centrifugal force to cause pressure plate 43 to bear against blade holder 25, the action of spring 51 is sufficient to move pressure plate 43 downwardly and facilitate removal of knife assembly 23. Those skilled in the art will recognize that spring 51 can also be disposed to aid the action of weight 44, and the knife assembly would then be removed by the use of a slight pressure to overcome the bias pressure exerted by the spring and permit removal of the knife assembly.

It is noted that the surface of pressure plate 43 which abuts blade holder 25 when the pressure plate is driven against it during operation of the machine is rounded, so that no matter the exact position of the pressure plate a positive contact with blade holder 25 is assured. If through inadvertence the operator forgets to insert knife assembly 23 after a sharpening or other maintenance operation, pressure plate 43 might be driven outwardly under the urging of weight 44 to engage and thus mar or destroy the work. To preclude such operation, a stop member 53 is positioned in the periphery of rotor body 20 to limit the maximum movement of pressure plate 43 under such conditions.

In FIGURE 2 the termination of lever 42 in pressure plate 43 is illustrated. As there shown, such lever comprises a pair of lateral arms 60 integral with pressure plate portion 43 at one end of the respective lateral arms. At their opposite ends, each of lateral arms 60 is pivoted by a bolt 61 in rotor body 20. The axis of bolts 61 is also the axis of rotation for the complete lever assembly 42, which axis is depicted by reference numeral 52 in FIGURES 1 and 2.

Figure 3:
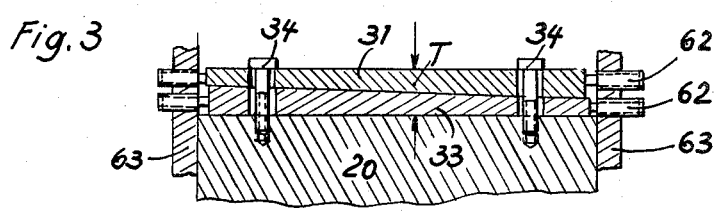
FIGURE 3 is a detail sectional view taken along the line 3—3 in FIGURE 1.

Indexing assembly 30 is shown in greater detail in FIGURE 3, wherein each of members 31 and 33 has a surface of given slope. The two sloping surfaces are positioned flush against each other so that, when bolts 34 are loosened and members 31 and 33 displaced transversely relative to each other, the effective thickness of both members 31 and 33 (shown as thickness dimension T) can be varied. A plurality of adjustment bolts 62 are provided in lateral cover plates 63 of the assembly to facilitate precise transverse alignment of members 31 and 33, and thus an exact determination of the thickness dimension T. After the desired dimension T is obtained, bolts 34 are again tightened to fix the assembly in position. Although stop lug 32 is omitted from FIGURE 3 to clarify the relative movement between members 31 and 33, it is evident that by precise regulation of dimension T, the exact point at which the reference surface of stop lug 32 is aligned, and thus the exact position of reference plane 28, can be adjusted by regulation of this dimension.

The pressure bar assembly 41 of FIGURE 1, including the weight and the pressure plate itself, has been replaced in FIGURE 4 by a pressure plate 80 fitted in bore 40. The centrifugal force developed by pressure plate 80 is augmented by that produced by a weight 81 fitted in another bore 82. Pressure plate 80 and weight 81 are interconnected by a lever system which comprises a first lever 83 and a second lever 84 pivotally connected by a bolt or pin 85. The end of lever 83 remote from bolt 85 is connected by a bolt 86 or other suitable means to rotor body 20, and another bolt or fastener 87 is utilized to connect an intermediate portion of lever 83 to pressure plate 80. Another bolt or fastener 88 serves to couple the end of lever 84 remote from bolt 85 to weight 81.

During rotation, weight 81 is forced away from the center of rotor body 20 by centrifugal force, displacing lever 84 outwardly in a radial direction with respect to rotor body 20 and tending to turn lever 83 in a counterclockwise direction about bolt 86. Accordingly an additional pressure is imparted, at the connection of lever 83 to pressure plate 80, to apply more force to its abutment with blade holder 25, thus insuring the precise alignment of the knife assemblies during operation of the woodworking machine. To preclude excessive outward movement of weight 81 in the event that bolt 85 or 88 becomes unfastened during operation, a cover plate 90 is provided to halt such outward movement of weight 81 before the work can be damaged.

It is evident that, when the machine is stopped so that a particular knife assembly is at or near the very top of the outer periphery of rotor body 20 to facilitate removal thereof, weight 81 is displaced by gravity towards the center of rotor body 20 and effects a clockwise pivoting motion of lever 83 about its fixed bolt 86. Accordingly, pressure plate 80 is displaced radially toward the center of rotor body 20, being moved away from knife assembly 23 in much the same manner that spring 51 of the embodiment shown in FIGURE 1 functions to effect such displacement when the woodworking machine is brought to a halt for removal of the knife assemblies.

If, during operation of the woodworking machine, sawdust or a similar material should filter into the slight tolerance space intermediate pressure plate 80 and bore 40, it is possible that the pressure plate 80 would be jammed in a position such as that shown in FIGURE 4, abutting blade holder 25 and preventing removal of the knife assemblies for renovation of the cutting edges. It would then be necessary to strike the pressure bars to jar them loose and permit removal of the knife assemblies. It is much simpler, however, to utilize a special loosening structure, shown in FIGURE 4, for freeing the pressure plate 80 when it becomes jammed.

As shown in FIGURE 4, a lever support structure 95 is positioned adjacent the rotor body of the woodworking machine. Two lever assemblies 96, one disposed on each side of the rotor body, are rotatably fastened as by a bolt 97 to lever support 95. Each lever assembly includes a lever arm 98, at one end of which a cam actuator wheel 100 is supported. At the other end of lever 98 an actuator 101 is affixed, and is effective to displace lever arm 98 and thus cam actuator 100 from the inoperative position as shown in solid lines to an operative position indicated in broken lines; a removable pin or other well-known means can be utilized to lock lever arm 98 in the broken-line position after rotation thereto by actuator 101. If one or more of the pressure plates 80 is stuck within its bore 40 after rotor body 20 has ceased rotation, actuator 101 is displaced in the direction indicated by the arrow to displace lever 98 in the counterclockwise direction; the lever 98 is then locked in the broken-line position. Rotor body 20 is then rotated slowly, so that each of cam actuator wheels 100 rides up the inclined camming surface 91 of a respective cam portion 92, and as it reaches the crest of surface 91, weight 81 is forced downwardly, thus applying a force to pressure plate 80 by reason of the connection of lever 83 at bolt 87 thereto, forcing pressure plate 80 toward the center of rotor body 20 and permitting removal of the knife assembly. Another function of the lever and cam actuator assemblies is to lock rotor body 20 in a fixed position for removal of the knife assemblies or other maintenance. This is accomplished by halting the rotor body and locking levers 98 in the broken-line position, so that each of cam actuator wheels 100 engages a locking surface 93 in one of the cam portions 92.

Knife assembly 23 is the same in the embodiment shown in FIGURE 4 as that depicted in FIGURES 1–3. However, recess 22 has been enlarged in the space adjacent blade holder 25 and indexing assembly 104 to receive a leaf spring 102, shown more clearly in FIGURE 5. Utilization of leaf spring 102 insures that, immediately after knife assembly 23 is inserted within recess 22 and positioned so that the reference surface of channel 27 fits flush against the reference surface of stop lug 32 in reference plane 28, this contact is maintained by the pressure of leaf spring 102 so that the knife assembly is positioned along the desired axis even before rotor body 20 is operated and the action of pressure plate 80 and weight 81 combine to bear against the contiguous portion of blade holder 25 and maintain the knife assembly in the proper operating position.

It is evident that leaf spring 102 exerts its force principally along the axis of the knife assembly. As an additional safeguard against displacement of the blade holder and knife when rotation of the rotor body commences, it may be desirable to add another spring such as spring 103. Spring 103 may comprise a part of indexing assembly 104, which differs from indexing assembly 30 in FIGURES 1–3 only by the addition of spring 103. Spring 103 includes a right-angle portion with an opening therein to receive bolt 34, and this portion is secured between the head of bolt 34 and member 31. The other end of spring 103 terminates in an arcuate portion which bears laterally against blade holder 25, thus serving to maintain the knife assembly flush against the wall of recess 22 which is adjacent knife 24.

FIGURE 5 serves to show the elements of FIGURE 4, and particularly the way in which spring 102 bears against the end of blade holder 25. Also shown more clearly is the manner in which bolts 26 of knife assembly 23 pass through oblong bolt holes 105 in blade holder 25, permitting relative adjustment of knife 24 and blade holder 25 when bolts 26 are loosened.

In the embodiment of the invention depicted in FIGURES 6 and 7, the cutting knife assembly differs from that of the previous embodiments, and the pressure plate is not fitted within a bore cut in the radial direction, for reasons that will be made clear hereinafter. In addition, the use of scoring knives in addition to the cutting knives of the previous embodiments is also shown.

More particularly, each cutting knife assembly 110 in FIGURES 6 and 7 includes a cutting knife 111, a plurality of bolts 112, the threaded ends of which are received in corresponding tapped portions of knife 111, and a bar member 113 through which bolts 112 pass. A recess 114 is provided to receive the knife assembly, and this recess is enlarged at 115 to receive bar 113. It will be evident from the foregoing explanation of the previous embodiments that a reference plane 28 is again formed where bar 113 abuts the reduced-diameter portion of recess 114 to form an accurate reference point from which the distance of the cutting edge of knife 111 can be measured after sharpening to insure a desired positioning of the entire knife assembly when the machine is operated.

Each scoring knife assembly 116 comprises a scoring knife 117 and a blade holder 118. A bolt 121 has its head portion received in a hollowed-out section of one surface of blade holder 118, and its threads extend through to be received in a tapped section of block 120, which is itself received in an aperture on another surface of blade holder 118. When the woodworking machine is operated, the scoring knife assemblies are utilized to score the wood just before the cutting knife assemblies engage the work to chip out or peel a thin layer from the work; accordingly the portion cut off subsequently by the cutting knives will be divided into several pieces over its entire length by reason of the previous action of scoring knives 117.

Pressure plate 122 is received in a bore section 123 which has an axis canted with respect to the radial direction. That is, as rotor body 20 is rotated, the maximum centrifugal force developed by pressure plate 122 is not parallel its own axis but is in effect divided and utilized at two different points. One side 124 of pressure plate 122 lies along a straight line, and is adjacent a slightly arcuate section 126; the ends of arcuate section 126 are pressed against cutting knife 111 during rotation of rotor body 20 to insure correct positioning of the cutting knives. The wall of pressure plate 122 opposite surface 124 comprises two different sections, including a first straight section 127 which parallels wall 124, and a second straight section 128 which forms an angle with section 127 and thus does not parallel wall 124. Surface 128, the working face of pressure plate 122 which bears against scoring blade holder 118 during operation of the machine, lies along a line which is non-parallel to the line along which is located the second working face (end portions of arcuate surface 126) which bears against knife 111 during operation of the woodworking machine, when pressure plate 122 is displaced outwardly by centrifugal force. The total centrifugal force applied by pressure plate 122 during rotation can be divided into a pair of component forces. The first of these, designated $F_c$, can be considered that component of the centrifugal force which causes the end portions of arcuate surface 126 to bear against a cutting knife 111, and the second component designated $F_s$ can be considered that part of the centrifugal force which is utilized as surface 128 bears against the contiguous portion of a scoring blade holder 118.

Pressure plate 122 may be jammed in bore 123 at the end of a cutting operation, and require jarring or other displacement to free it. The operative position of a pressure plate 122 (rotor body 20 rotating) is indicated to the right of letter A in FIGURE 6, and the desired position of the pressure plate to facilitate removal of the knife assemblies is indicated to the left of letter B. To assist return of the pressure plate to the position shown at B, a bell crank type assembly 130 is utilized.

The bell crank includes a leaf spring member 131 which acts as the first arm thereof, which member is secured at one end by a bolt 132 or similar fastening means in pressure plate 122. One end of a journal member 133 is secured by a pin 134 or other pivotal connection to the other end of leaf spring 131; journal 133 forms the second arm of the bell crank. The end of journal 133, remote from spring 131, is fixed to rotor body 20 to pivot about an axis 135, and an extension of this end of journal 133 is formed into a square 136 for receiving a wrench or other actuator to effect rotation of journal 133 about axis 135. If the rotor body comes to rest with a pressure plate 122 jammed in the position indicated at A in FIGURE 6, a wrench is applied to the square section 136 and journal 133 is rotated in the clockwise direction to a position such as that shown at B. This rotation of pin 134 at the joint of the two arms of bell crank 130 begins to straighten leaf spring 131 and, when sufficient force is provided to free pressure plate 122, the plate is driven downwardly to the position shown at B; the knives may then be readily removed.

In the embodiment of FIGURES 8 and 9, the positions of the channel and stop lug which meet in reference plane 28 have been reversed with respect to the wall of recess 22 against which the cutting knife is positioned. As there shown, a knife assembly 145 includes a knife 146 and a blade holder 147 secured together by bolts 148. Indexing assembly 150 includes an L-shaped stop member 151 which is secured by bolts 152 to rotor body 20. A channel is provided in the end of blade holder 147, and one side of the channel is a reference surface which fits flush against a corresponding reference surface on the upstanding leg or stop lug section 153 of member 151. By turning the channel in the blade holder 147 to the side opposite that on which the pressure plate engages the blade holder, blade holder 147 is readily lifted off stop lug 153 after movement of pressure plate 154 toward the axis of rotor body 20.

In this embodiment, the stroke of pressure plate 154 within its bore must be sufficiently long to permit loosening blade holder 147 when one end fits flush into the space provided between stop lug 153 and the longer member 149 of L-shaped member 151. To permit the removal of knife assembly 145 in the radial direction, the construction of indexing assembly 150 (and specifically the position of stop lug 153 with respect to knife assembly 145) is reversed as compared to the previous embodiments. Pressure plate 154 is connected to a shaft 155 which passes through an opening in sealing plate 156; a piston 158 is affixed to the end of shaft 155, forming a first chamber 157 between the lower face of the piston and the cylindrical recess in which piston 158 is received, and a second chamber 159 between the upper face of piston 158 and sealing plate 156. Hydraulic or pneumatic fluid under pressure can be supplied through supply lines 161 to chamber 157, driving pressure plate 154 upwardly to firmly seat the pressure plate against blade holder 147 of knife assembly 145. To free the knife assembly for removal, the fluid under pressure is passed through supply lines 60 into chamber 159. Accordingly, the fluid enters chamber 159 and forces piston 158 downwardly, drawing pressure plate 154 downwardly to permit the removal of knife assembly 145.

The embodiment of the invention depicted in FIGURES 10 and 11 differs principally from the preceding embodiments in that the solid rotor body 20 is replaced by a hollow rotor body 170. That is, the central section of rotor body 170 is hollowed out and the cutting and scoring knives project into the hollow section, to effect their respective functions upon a work piece mounted within the interior of hollow rotor body 170. Knife assembly 171 includes a cutting knife 172 and a blade holder 173, fastened together by bolts 174. An indexing assembly 175 positioned adjacent knife assembly 171 includes a first member 176, and another member 177 including a stop lug portion for engagement with a surface of the channel in blade holder 173. The knife assembly and the indexing assembly are positioned in a recess 178 adjacent a wedge-shaped pressure plate 180. On the other side of pressure plate 180 is a scoring knife assembly 181, positioned in a recess 182. Scoring knife 181 is similar to scoring knife assembly 116 shown in FIGURE 6.

When hollow rotor body 170 is rotated, wedge-shaped pressure plate 180 is displaced outwardly toward its outer periphery, and the working faces 193 and 194 of the pressure plate bear against the cutting and scoring knife assemblies, forcing them into the desired position for the cutting and scoring operations. When the woodworking machine is halted, each pressure plate 180 is prevented from falling out into the hollow central portion by a bolt 183 which has a collar portion 184 and a threaded portion which engages a corresponding tapped section in pressure plate 180. Each bolt 183 also passes through a bushing 185 which is fitted within a recess 186; a recess 187 of smaller diameter than recess 186 extends beneath recess 186 for receiving collar 184 and a pair of oppositely-disposed cup springs 188 and 190. The cup springs engage each other at their apices, with cup spring 190 pressing against collar 184 of bolt 183, and cup spring 188 resting against bushing 185. Accordingly when the woodworking machine is stopped, the force exerted by cup springs 188 and 190 displaces pressure plate 180 toward the center of the rotor body, as indicated in FIGURE 10, thus leaving a space between the working faces of pressure plate 180 and the cutting and scoring knife assemblies. During operation of the machine, plate 180 is driven toward the outer periphery of rotor body 170 by centrifugal force and cup springs 188 and 190 are flexed as collar 184 is driven toward bushing 186. After the rotation ceases, the mechanisms resume the position indicated in FIGURES 10 and 11.

Figure 12:
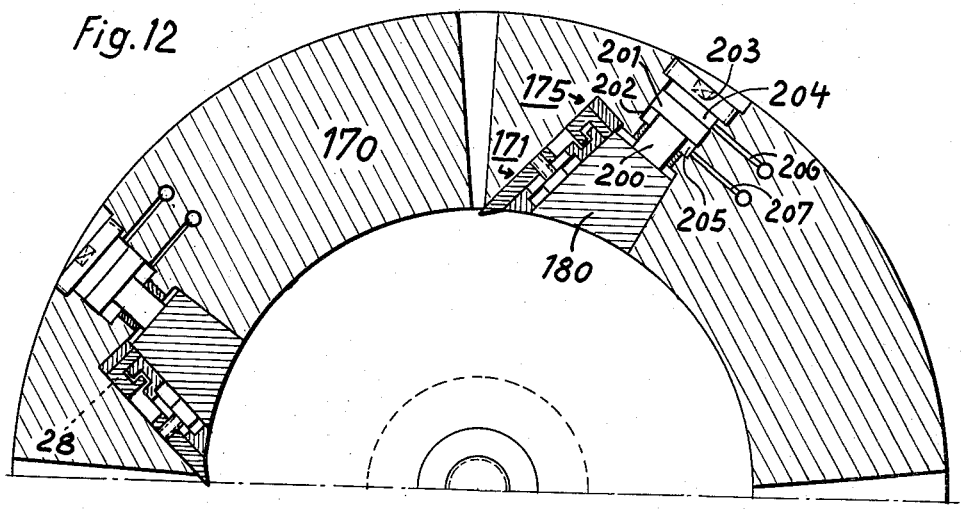
FIGURE 12 is a side sectional view of another embodiment of the invention.

The embodiment of FIGURE 12 also includes a hollow rotor body 170, a cutting knife assembly 171, an indexing assembly 175, and a wedge shaped pressure plate 180. The pressure plate is connected by a shaft 200 to a piston 201, which is fitted within a bore 202. A plug 203 effectively seals the outside of bore 202, thus forming a first chamber 204 between piston 201 and plug 203. A second chamber 205 is formed below piston 201. Hydraulic or pneumatic fluid under pressure can be passed through either of supply lines 206 and 207 to chamber 204 or 205, to either free knife assembly 171 after rotation of rotor body 170 has ceased, or to seat pressure plate 180 firmly against the cutting knife assembly; such operation is similar to that effected in the embodiment of FIGURES 8 and 9 when fluid is passed through line 160 or line 161.

That is, after the rotor body has come to rest and it is desired to remove the knife assembly for renewing the cutting edge, compressed air or some other fluid under pressure can be passed through supply line 206 into chamber 204, driving piston 201 toward the center of rotor body 170 and freeing pressure plate 180 to permit removal of knife assembly 171. After the cutting edge has been ground and the relative positions of the knife and the blade holder fixed, the knife assembly is again inserted and compressed air can then be passed through line 207 to enter chamber 205 and drive piston 201 away from the center of rotor body 170, firmly seating pressure plate 180 against the knife assembly and holding this assembly in position for the cutting operation. As compressed air or other fluid under pressure is fed into either line 206 or 207, the opposite line should be vented to permit ready movement of piston 201 in response to application of the fluid under pressure.

Figure 13:
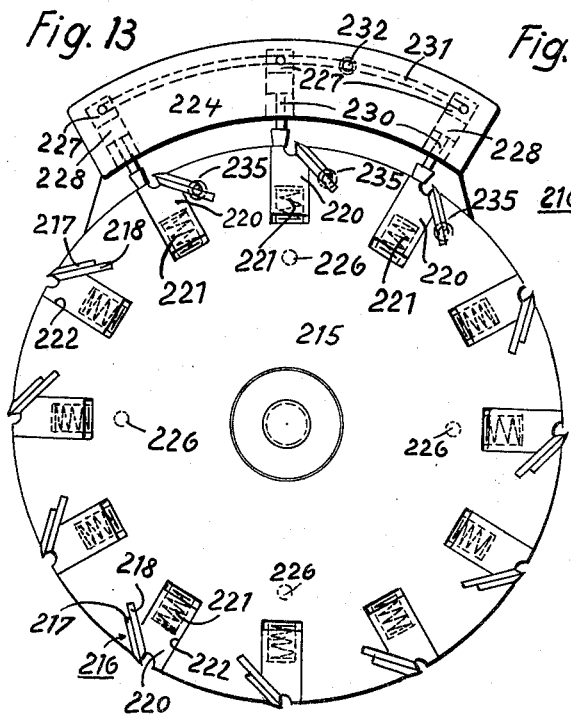
FIGURES 13 and 14 are front and side views, respectively, of a mechanism for cooperation with a woodworking machine constructed according to the inventive teaching.
Figure 14:
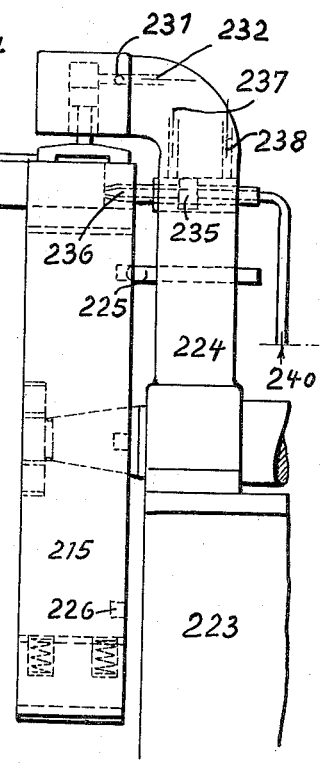

In many of the foregoing embodiments (e.g., FIGURES 1 and 4), only four cutting knife assemblies are shown distributed around the periphery of the rotor body. For certain operations it may be desirable to utilize a woodworking machine which includes a larger number of knife assemblies; FIGURES 13 and 14 indicate a rotor body 215 in which 12 knife assemblies are positioned. Each knife assembly 216 includes a knife 217 and a blade holder 218, and the assembly is positioned adjacent a pressure plate 220 fitted in a bore 222 and urged by a spring 221 against the blade holder.

Rotor body 215 is supported from a base 223, which also supports an upstanding bracket 224. A slidable pin 225 is provided in one portion of bracket 224; during rotation of rotor body 215, pin 225 is retracted within bracket 224 to permit free rotation of the rotor body. When rotor body 215 is halted and pin 225 is pushed into engagement with one of the corresponding indexing apertures 226 in rotor body 215, and the rotor body is locked in position to permit removal of the knife assemblies. When pin 225 engages the uppermost indexing aperture 226, three different knife assemblies 216 are positioned for removal and sharpening of the cutting edges.

In the upper portion of bracket 224 are three separate bores 227; in each bore a piston 228 and a piston rod 230 are fitted. A common supply line 231 is connected to the upper portion of each bore 227, and a supply line 232 is connected to line 231. Accordingly when a hydraulic or pneumatic fluid under pressure, such as compressed air, is supplied from line 232, pressure is applied to the top of each piston 228 to drive its piston rod 230 downwardly, engaging the adjacent pressure plate 220 of each of the three knife assemblies disposed beneath bracket 224. Thus depression of three pressure plates 220 frees the related knife assemblies for removal.

It is evident that by practice of the invention a woodworking machine is provided in which the cutting knife assemblies may be removed for sharpening, and, when replaced within the rotor body, the projection of the cutting edge of the knife beyond the periphery of the rotor body is very accurately determined. This is made possible by utilizing a knife assembly having two members movable with respect to each other; after the edge of the cutting knife is ground down during sharpening, the knife and blade holder are moved until the cutting edge is set at a predetermined distance from a reference surface or plane on the blade holder. By providing a corresponding reference surface within rotor body 20, for example, on an indexing assembly therein, and reinserting the blade assembly so that the indexing surface of the blade holder fits flush against the indexing surface of the indexing assembly, it is evident that the projection of the sharpened edge of the knife beyond the outer portion of the rotor body is very accurately preset.

While only particular embodiments of the invention have been shown and described, it is evident that alterations and modifications may be made therein, and it is intended in the appended claims to cover all such alterations and modifications as may fall within the true spirit and scope of the invention.

What is claimed is:

1. For use with a woodworking machine including a rotor body comprising a plurality of recesses for receiving a plurality of knife assemblies, said rotor body further including a first reference surface disposed adjacent each of said recesses, the improvement which comprises a knife assembly including: a knife having a cutting edge; a blade holder having a second reference surface thereon for engagement flush with said first reference surface in a reference plane to determine a preassigned distance between said reference plane and said cutting edge; and fastening means for enabling relative displacement between said knife and said blade holder externally of said rotor body and for thereafter maintaining said knife and said blade holder in predetermined fixed relationship to determine the extent of said preassigned distance, thus fixing the extent of projection of said cutting edge beyond said rotor body upon insertion of said knife assembly in one of said recesses.

2. For use with a woodworking machine including a rotor body comprising a plurality of recesses for receiving a plurality of knife assemblies, said rotor body further including an indexing assembly, having a stop lug including a first reference surface thereon, disposed adjacent each of said recesses, the improvement which comprises a knife assembly including: a knife having a cutting edge; a blade holder having a channel including a second reference surface therein for engagement flush with said first reference surface in a reference plane to determine a preassigned distance between said reference plane and said cutting edge; and fastening means including a plurality of bolts for enabling relative displacement between said knife and said blade holder externally of said rotor body and for thereafter maintaining said knife and said blade holder in predetermined fixed relationship to determine the extent of said preassigned distance, thus fixing the extent of projection of said cutting edge beyond said rotor body upon insertion of said knife assembly in one of said recesses.

3. A woodworking machine and knife assembly according to claim 1 and further comprising a spring positioned intermediate said blade holder and said rotor body when said knife assembly is inserted in one of said recesses, to effect flush engagement of said first and second reference surfaces in said reference plane.

4. A woodworking machine and knife assembly according to claim 1 and further comprising a spring positioned in each of said recesses adjacent said blade holder to act laterally on said blade holder and force said knife assembly against one wall of said recess.

5. For use with a woodworking machine including a rotor body comprising a plurality of recesses for receiving a plurality of knife assemblies, said rotor body further including indexing means, having a first reference surface thereon, disposed adjacent each of said recesses, the improvement which comprises a knife assembly including: a knife having a cutting edge and a tapped portion opposite said cutting edge; and a blade holder assembly including bolt means and a bar having a second reference thereon for engagement flush with said first reference surface in a reference plane to determine a preassigned distance between said reference plane and said cutting edge, whereby adjustment of said bolt means enables relative displacement between said knife and said bar externally of said rotor body to determine the extent of said preassigned distance, thus fixing the extent of projection of said cutting edge beyond said rotor body upon insertion of said knife assembly in one of said recesses.

6. A woodworking machine including a rotor body comprising: a plurality of recesses for receiving a plurality of knife assemblies; an indexing assembly disposed adjacent each of said recesses having a first member with a first reference surface thereon, a second member positioned adjacent said first member and movable relative thereto to vary the location of said first reference surface in said rotor body, and adjusting means for effecting relative displacement between said first and second members; and a knife assembly including a knife having a cutting edge, a blade holder having a second reference surface thereon for engagement flush with said first reference surface in a reference plane to determine a preassigned distance between said reference plane and said cutting edge, and fastening means for enabling relative displacement between said knife and said blade holder externally of said rotor body and for thereafter maintaining said knife and said blade holder in predetermined fixed relationship to determine the extent of said preassigned distance, thus fixing the extent of projection of said cutting edge beyond said rotor body upon insertion of said knife assembly in one of said recesses.

7. A woodworking machine including a rotor body comprising: a plurality of recesses for receiving a plurality of knife assemblies; an indexing assembly disposed adjacent each of said recesses having a first member with a first reference surface and a surface having a given slope thereon, a second member having a surface of said given slope positioned flush against the sloping surface of said first member and movable relative thereto to vary the location of said first reference surface in said rotor body, and adjusting means including a plurality of bolts for effecting relative displacement between said first and second members; and a knife assembly including a knife having a cutting edge, a blade holder having a second reference surface thereon for engagement flush with said first reference surface in a reference plane to determine a preassigned distance between said reference plane and said cutting edge, and fastening means for enabling relative displacement between said knife and said blade holder externally of said rotor body and for thereafter maintaining said knife and said blade holder in predetermined fixed relationship to determine the extent of said preassigned distance, thus fixing the extent of projection of said cutting edge beyond said rotor body upon insertion of said knife assembly in one of said recesses.

8. A removable knife assembly for use in a woodworking machine having a first reference surface therein comprising: a cutting knife having a cutting edge, a flat surface thereon, and at least one tapped hole; a blade holder having a second reference surface for engagement flush with said first reference surface in a reference plane, a flat surface abutting the flat surface of said knife, and at least one oblong bolt hole therein; and fastening means including at least one bolt passing through said oblong bolt hole and secured in said tapped hole, for permitting relative adjustment between said knife and said blade holder to fix the extent of the distance between said reference plane and said cutting edge to thereby determine the projection of said cutting edge beyond the periphery of said rotor body upon insertion of said knife assembly in said rotor body.

9. A removable knife assembly for use in a woodworking machine having a first reference surface therein comprising: a cutting knife having a cutting edge, a flat surface thereon, and a plurality of tapped holes; a blade holder having a second reference surface for engagement flush with said first reference surface in a reference plane, a flat surface abutting the flat surface of said knife, and a plurality of oblong bolt holes therein; and fastening means including a plurality of bolts passing through said oblong bolt holes and secured in said tapped holes, for permitting relative adjustment between said knife and said blade holder to fix the extent of the distance between said reference plane and said cutting edge to thereby determine the projection of said cutting edge beyond the periphery of said rotor body upon insertion of said knife assembly in said rotor body.

10. A removable knife assembly for use in a woodworking machine having a first reference surface therein comprising: a cutting knife having a cuting edge, a shank portion, and at least one tapped hole in said shank; and a blade holder assembly including a bar having a second reference surface for engagement flush with said first reference surface in a reference plane, and at least one bolt passing through said bar and secured in said tapped hole, for permitting relative adjustment between said knife and said bar to fix the extent of the distance between said reference plane and said cutting edge to thereby determine the projection of said cutting edge beyond the periphery of said rotor body upon insertion of said knife in said rotor body.

11. A removable knife assembly for use in a woodworking machine having a first reference surface therein comprising: a cutting knife having a cutting edge, a shank portion, and a plurality of tapped holes in said shank; and a blade holder assembly including a bar having a second reference surface for engagement flush with said first reference surface in a reference plane, and a plurality of bolts passing through said bar and secured in said tapped holes, for permitting relative adjustment between said knife and said bar to fix the extent of the distance between said reference plane and said cutting edge to thereby determine the projection of said cutting edge beyond the periphery of said rotor body upon insertion of said knife in said rotor body.

12. A woodworking machine comprising: a rotor body including a plurality of recesses and a first reference surface disposed adjacent each of said recesses; a cutting knife assembly adjustable externally of said rotor body comprising a knife and a blade holder having a second reference surface for flush engagement with said first reference surface in a reference plane upon insertion in one of said recesses; a bore adjacent said recess; and a pressure plate fitted in said bore, actuable by centrifugal force to bear against said knife assembly and maintain said assembly in a predetermined operative position during rotation of said rotor body.

13. A woodworking machine according to claim 12 in which said pressure plate includes a lever arm pivoted about an axis on the side of said pressure plate opposite said knife assembly, a shaft connected to said pressure plate, and a bias spring positioned to exert pressure on the bottom of said shaft and urge said pressure plate toward the center of said rotor body when said machine is at rest.

14. A woodworking machine according to claim 12 in which a weight is positioned in said bore below said pressure plate, and a cover is provided adjacent said pressure plate to limit the outward movement of said plate during rotation of said machine.

15. A woodworking machine according to claim 12 including a bell crank mechanism, one arm of said bell crank comprising a leaf spring connected at one end to said pressure plate and at the other end to a pivotal element, and the other arm of said bell crank comprising a journal member connected between said pivotal element and said rotor body.

16. A woodworking machine according to claim 12 and further comprising a scoring knife assembly positioned on the side of said pressure plate opposite said cutting knife assembly, in which said pressure plate includes a pair of non-parallel working faces to lock the cutting and the scoring knife assemblies in position during operation of the machine.

17. A woodworking machine comprising: a hollow rotor body including a plurality of recesses and a first reference surface disposed adjacent each of said recesses; a cutting knife assembly adjustable externally of said hollow rotor body comprising a knife and a blade holder having a second reference surface for flush engagement with said first reference surface in a reference plane upon insertion in one of said recesses; a wedge-shaped bore adjacent said recess; and a wedge-shaped pressure plate fitted in said bore, actuable by centrifugal force to bear against said knife assembly and maintain said assembly in a predetermined operative position during rotation of said hollow rotor body.

18. A woodworking machine according to claim 17 and further comprising a plurality of bolts passing through said hollow rotor body, a second recess, a collar for each of said bolts positioned at one end of said second recess, at least one spring in said second recess, said bolts securing said pressure plates in said hollow rotor body and said spring bearing against said collar to urge its corresponding pressure plate out of said bore.

19. A woodworking machine according to claim 17 and further comprising a piston fitted in a chamber and connected to one of said pressure plates, a first supply line connected to conduct fluid to said chamber on one side of said piston, and a second supply line connected to conduct fluid to said chamber at the opposite side of said piston.

20. In combination with a woodworking machine according to claim 12, a bracket positioned adjacent said rotor body and including piston means operable by fluid pressure to depress said pressure plates within said bores, and a line for supplying fluid under pressure to said piston means.

21. In combination with a woodworking machine as recited in claim 12, a bracket positioned adjacent said rotor body comprising a plurality of pistons, each including a piston rod, and a fluid pressure line connected to admit fluid under pressure to said pistons and displace said piston rods to engage said knife assemblies and displace said knife assemblies at least partially out of their recesses.

References Cited in the file of this patent

UNITED STATES PATENTS

| | | |
|---|---|---|
| 2,449,605 | Kelton | Sept. 21, 1948 |
| 2,822,839 | Frodermann | Feb. 11, 1958 |

FOREIGN PATENTS

| | | |
|---|---|---|
| 79,836 | Norway | Mar. 3, 1952 |
| 542,727 | France | May 20, 1922 |
| 902,786 | Germany | Feb. 8, 1954 |
| 915,265 | Germany | July 19, 1954 |
| 1,021,565 | Germany | Dec. 27, 1957 |

UNITED STATES PATENT OFFICE
CERTIFICATION OF CORRECTION

Patent No. 3,014,511　　　　　　　　　　　　　　December 26, 1961

Paul Arthur Kirsten

It is hereby certified that error appears in the above numbered patent requiring correction and that the said Letters Patent should read as corrected below.

Column 11, line 24, after "reference" insert -- surface --.

Signed and sealed this 24th day of April 1962.

(SEAL)
Attest:

ESTON G. JOHNSON
Attesting Officer

DAVID L. LADD
Commissioner of Patents